(12) United States Patent
Wada et al.

(10) Patent No.: US 6,655,209 B2
(45) Date of Patent: Dec. 2, 2003

(54) AUTOMOTIVE METER HAVING ILLUMINATED POINTER

(75) Inventors: Toshiki Wada, Kariya (JP); Masami Kataoka, Anjo (JP); Katsuhiro Kumazawa, Anjo (JP)

(73) Assignee: Denso Corporation, Kariya (JP)

( * ) Notice: Subject to any disclaimer, the term of this patent is extended or adjusted under 35 U.S.C. 154(b) by 75 days.

(21) Appl. No.: 10/192,525

(22) Filed: Jul. 11, 2002

(65) Prior Publication Data

US 2003/0066349 A1 Apr. 10, 2003

(30) Foreign Application Priority Data

Oct. 9, 2001 (JP) .......................... 2001-311720

(51) Int. Cl.[7] .......................... G01P 15/00; G01P 3/00; G01D 7/02; G09F 9/00
(52) U.S. Cl. .......................... 73/491; 73/499; 73/866.3; 116/284
(58) Field of Search .............. 73/491, 866.3, 73/499; 116/286, 284

(56) References Cited

U.S. PATENT DOCUMENTS 4,878,453 A * 11/1989 Inoue et al. ................. 116/288
5,636,589 A * 6/1997 Kato et al. ................... 116/286
6,382,127 B2 * 5/2002 Wehner ....................... 116/284

FOREIGN PATENT DOCUMENTS

JP U-5-19918 3/1993

* cited by examiner

Primary Examiner—Hezron Williams
Assistant Examiner—Tamiko Bellamy
(74) Attorney, Agent, or Firm—Posz & Bethards, PLC (57) ABSTRACT

A pointer of a meter such as a speedometer for use in an automobile is so structured that it is observed as if its illuminated length extends upon turning on a key switch and as if its illuminated length is shortened upon turning off the key switch, thereby giving an ornamental effect to the meter. A pointer cover gradually covering or exposing the illuminated pointer may be provided at a vicinity of a zero-scale position. The pointer may be progressively illuminated by plural light sources disposed behind a scale plate by tuning on the light sources one by one. The light sources such as light-emitting diodes may be embedded in the transparent pointer needle. Plural light sources covered by a bimetal cover may be disposed at a foot portion of the pointer needle, and the bimetal cover may be heated to gradually uncover the light sources thereby to progressively illuminate the pointer needle.

9 Claims, 8 Drawing Sheets

AUTOMOTIVE METER HAVING ILLUMINATED POINTER

CROSS-REFERENCE TO RELATED APPLICATION

This application is based upon and claims benefit of priority of Japanese Patent Application No. 2001-311720 filed on Oct. 9, 2001, the content of which is incorporated herein by reference.

BACKGROUND OF THE INVENTION

1. Field of the Invention

The present invention relates to a meter such as a speedometer for use in an automotive vehicle.

2. Description of Related Art

An example of a meter for use in an automotive vehicle that includes a mechanically extendable pointer is shown in JP-U-5-19918. The pointer used in the meter slidably extends as the pointer rotates from a zero-scale position toward a full-scale position. The pointer is guided by a guiding groove according to its rotation. However, the structure of the meter becomes complex, because the pointer has to include two pieces of pointer needles telescopically connected to each other, and a guiding groove has to be additionally formed on a scale plate.

SUMMARY OF THE INVENTION

The present invention has been made in view of the above-mentioned problem, and an object of the present invention is to provide a meter having an illuminated pointer that looks like extending or shrinking at a zero-scale position or at a vicinity of the zero-scale position without providing a complex mechanical structure, thereby enhancing an ornamental effect of the meter.

A meter such as a speedometer for use in an automobile vehicle includes a scale plate having scale positions circularly aligned in a clockwise direction from a zero scale position to a full-scale position and an illuminated pointer driven by a pointer driver under control of an electronic controller. The meter is so structured that the illuminated pointer is observed as if it extends when a key switch is turned on and as if it is shortened when the key switch is turned off. The meter having this effect is realized by the following ways without providing a complex mechanical structure.

The meter is structured so that the pointer rotates counter-clockwise beyond the zero-scale position up to a rest position when a key switch is turned off. A pointer cover for covering a portion of the pointer in a region between the zero-scale position and the rest position is formed on the scale plate. The pointer is illuminated by light-emitting elements such as light-emitting diodes disposed behind the scale plate.

Upon turning on the key switch when the pointer is positioned at the rest position, a full length of the pointer is illuminated by the light-emitting elements. A considerable part of the tip portion of the pointer is covered by the pointer cover at the rest position. The pointer is rotated clockwise from the rest position to the zero-scale position. The covered part of the pointer is gradually shortened as the pointer rotates clockwise, and the pointer is fully exposed when it reaches the zero-scale position. Therefore, the pointer is observed as if it gradually extends in the course of rotation from the rest position to the zero-scale position, thereby giving an ornamental effect to the pointer. On the other hand, when the pointer rotates counter-clockwise from the zero-scale position to the rest position upon turning off the key switch, the pointer is observed as if it is gradually shortened.

Alternatively, plural light-emitting elements for illuminating the pointer at the zero-scale position are disposed behind the scale plate. Upon turning on the key switch, the plural light-emitting elements are lit one by one so that the pointer is progressively illuminated from its foot portion toward its tip portion. In this manner, the pointer looks like gradually extending at the zero-scale position.

Alternatively, plural light-emitting diodes are embedded in a transparent pointer needle. The embedded light-emitting diodes are sequentially lit to illuminate the pointer progressively from its foot portion toward its tip portion upon turning on the key switch. When the key switch is turned off, the light-emitting diodes are switched off one by one from the one positioned at the tip of the pointer so that illumination of the pointer progressively disappears from the tip portion of the pointer toward the foot portion. In this manner, the pointer is observed as if it is extended or shortened at its zero-scale position. Each light-emitting diode is connected in series to a Zener diode having a respectively different breakdown voltage, and the breakdown voltage of each Zener diode is set to switch on the light-emitting diodes one by one from the one positioned at the foot of the pointer upon turning on the key switch.

Alternatively, plural light sources are disposed in a pointer base connected to a foot of a pointer needle and are covered by bimetal cover. When the key switch is turned on, all the light sources are switched on, and at the same time the bimetal cover is heated to gradually uncover the light sources thereby to progressively illuminate the pointer needle from its foot portion toward its tip portion. On the other hand, upon turning off the key switch, the bimetal cover is cooled to gradually cover the light sources so that illumination of the pointer progressively disappears from its top portion toward its foot portion.

According to the present invention, the pointer of the meter can be so made that it looks like extending or shrinking when the key switch is turned on or off. An ornamental effect is given to the meter without providing a complex mechanical structure.

Other objects and features of the present invention will become more readily apparent from a better understanding of the preferred embodiments described below with reference to the following drawings.

DETAILED DESCRIPTION OF THE PREFERRED EMBODIMENTS (First Embodiment)

A first embodiment of the present invention will be described with reference to FIGS. 1–3. The present invention is applicable to meters for use in an automobile such as a speedometer installed in an instrument panel. First, referring to FIGS. 1 and 2, a structure of a speedometer will be described. The speedometer is housed in a housing composed of a rectangular casing 10, a hood 20 and a front panel 30. The speedometer is composed of a scale plate 40, a circuit board 50, plural light-emitting elements 60, a pointer driver 70 and an illuminated pointer 80.

The hood 20 is connected to an opening 11 of the casing 10, and a substantially circular opening 21 is formed on a bottom wall 20a of the hood 20. A pointer cover 20c is formed on the bottom wall 20a of the hood 20 at a position shown in FIG. 1. The pointer cover 20c includes a sidewall 22 standing from the bottom wall 20a of the hood 20 and a roof wall 23 extending from the sidewall 22. An upper fringe 23a of the roof wall 23 is positioned as shown in FIG. 1. As the pointer 80 rotates counter-clockwise beyond a zero-scale position of the scale plate 40 (from a position shown by a solid line to a position shown by a dotted line in FIG. 1), part of a pointer needle 82 of the pointer 80 is covered by the roof wall 23 and becomes invisible. The upper fringe 23a of the roof wall 23 is formed with a slant angle so that the part of the pointer needle 82 covered by the roof wall 23 gradually increases when the pointer needle 82 rotates counter-clockwise beyond the zero-scale position. On the other hand, the covered part of the pointer needle 82 gradually decreases when the pointer needle 82 rotates clockwise toward the zero-scale position.

The front panel 30 having a transparency of about 20% serves as a black face. The front panel 30 is inserted into a front opening 24 of a outer wall 20b of the hood 20, as shown in FIG. 2. A circular scale 41 that includes scale marks 41a and numerals 41b from 0 to 180 showing vehicle speeds in kilometer per hour is printed on the scale plate 40, as shown in FIG. 1. The circuit board 50 is disposed behind the scale plate 40 and supported on a front surface of the pointer driver 70. Plural light-emitting elements 60 such as light-emitting diodes are positioned around a through-hole 51 of the circuit board 50. Light emitted from the light-emitting elements 60 is led through a through-hole 42 of the scale plate 40 and incident upon a pointer base 81 of the pointer 80.

The pointer driver 70 having a driving axis 72 for rotating the pointer 80 is fixed to a bottom wall 12 of the casing 10. The pointer 80 has a pointer needle 82 made of a transparent resin material, a pointer base 81 and a cap 80b for intercepting light emitted toward a front side. The pointer base 81 includes a boss 81a that extends through the opening 42 and is connected to the driving axis 72 of the pointer driver 70, so that the pointer needle 82 rotates along the circular scale 41. As shown in FIG. 2, a front surface of the pointer needle 82 is formed with a slant angle relative to a front surface of the scale plate 40 so that the front surface of the pointer needle 82 is parallel to the roof wall 23 of the pointer cover 20c.

Figure 2:
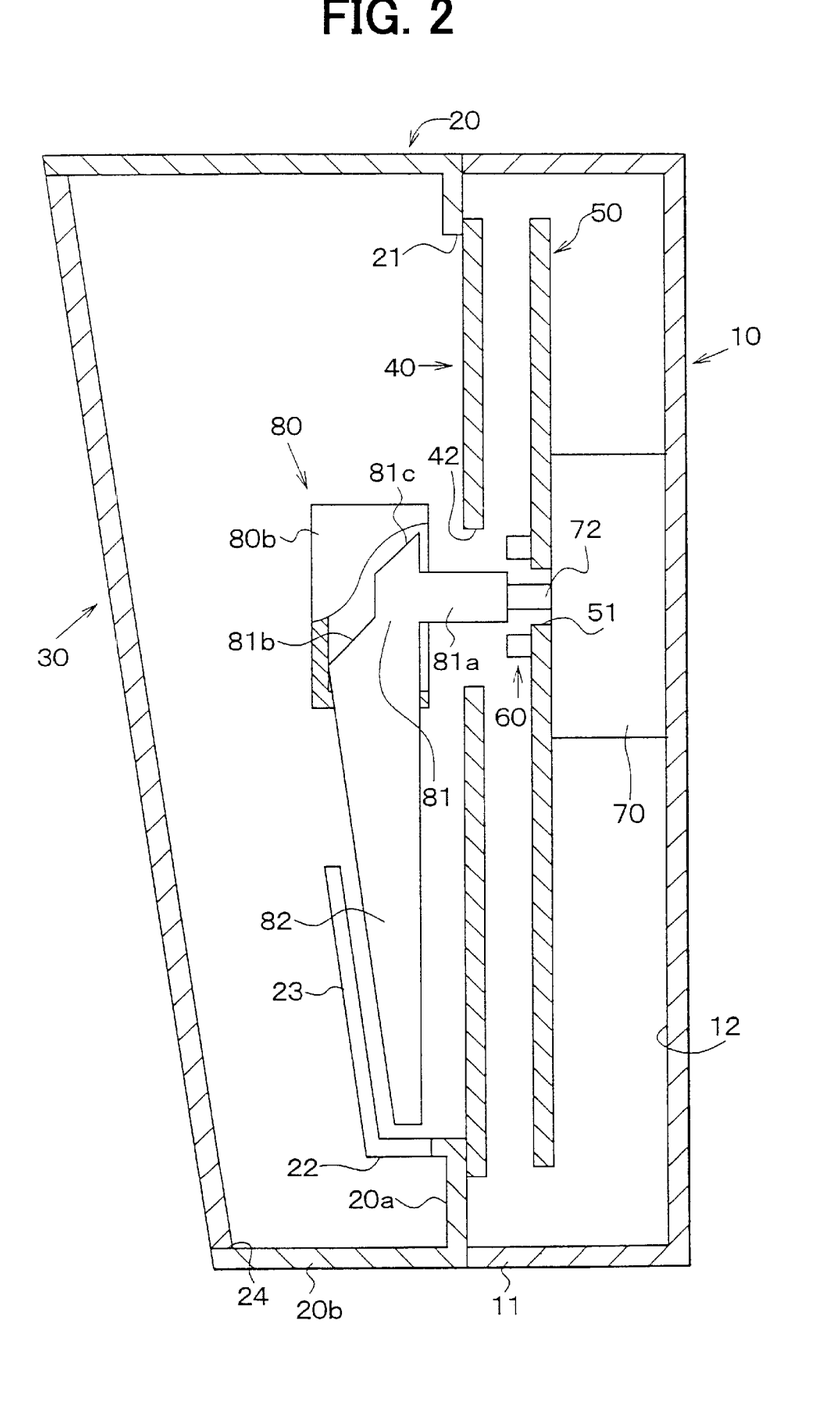
FIG. 2 is a cross-sectional view showing the speedometer, taken along line II—II shown in FIG. 1.

Light-reflecting surfaces 81b and 81c are formed on the rear end of the pointer base 81, as shown in FIG. 2. The light-reflecting surface 81b reflects light emitted from the light-emitting element 60 located at a position closer to the tip of the pointer needle 82 to lead the light to the pointer needle 82. The light-reflecting surface 81c reflects light emitted from the light-emitting diode 60 located at a position far from the tip of the pointer needle 82 to lead the light to the pointer needle 82. The pointer needle 82 is illuminated in this manner and becomes visible through the front panel 30. The cap 80b covers the pointer base 81 to intercept light emitted from the front surface of the pointer base 81.

Figure 3:
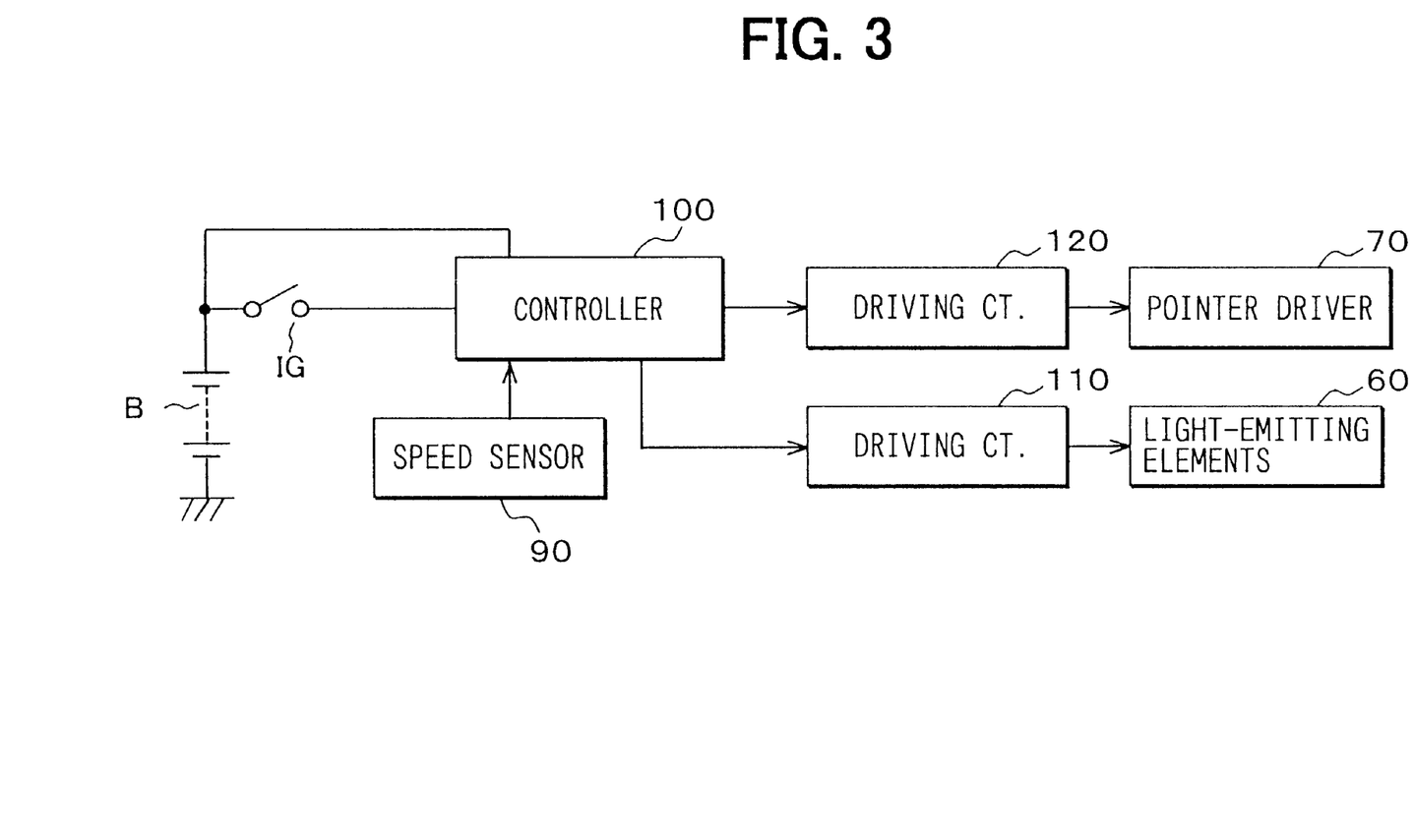
FIG. 3 is a block diagram showing an electrical circuit for controlling operation of the speedometer shown in FIG. 1.

Referring to FIG. 3, an electrical circuit for driving the meter will be described. A vehicle speed sensor 90 connected to a controller 100 detects a driving speed of a vehicle. The controller 100 including a micro-computer is always kept ready to operate by an on-board battery B. Electric power is supplied to the controller 100 from the battery B by turning on an ignition switch IG, and the controller 100 controls, under a program contained therein, operation of a driving circuit 110 for driving the light-emitting elements 60 and a driving circuit 120 for driving the pointer driver 70.

Figure 1:
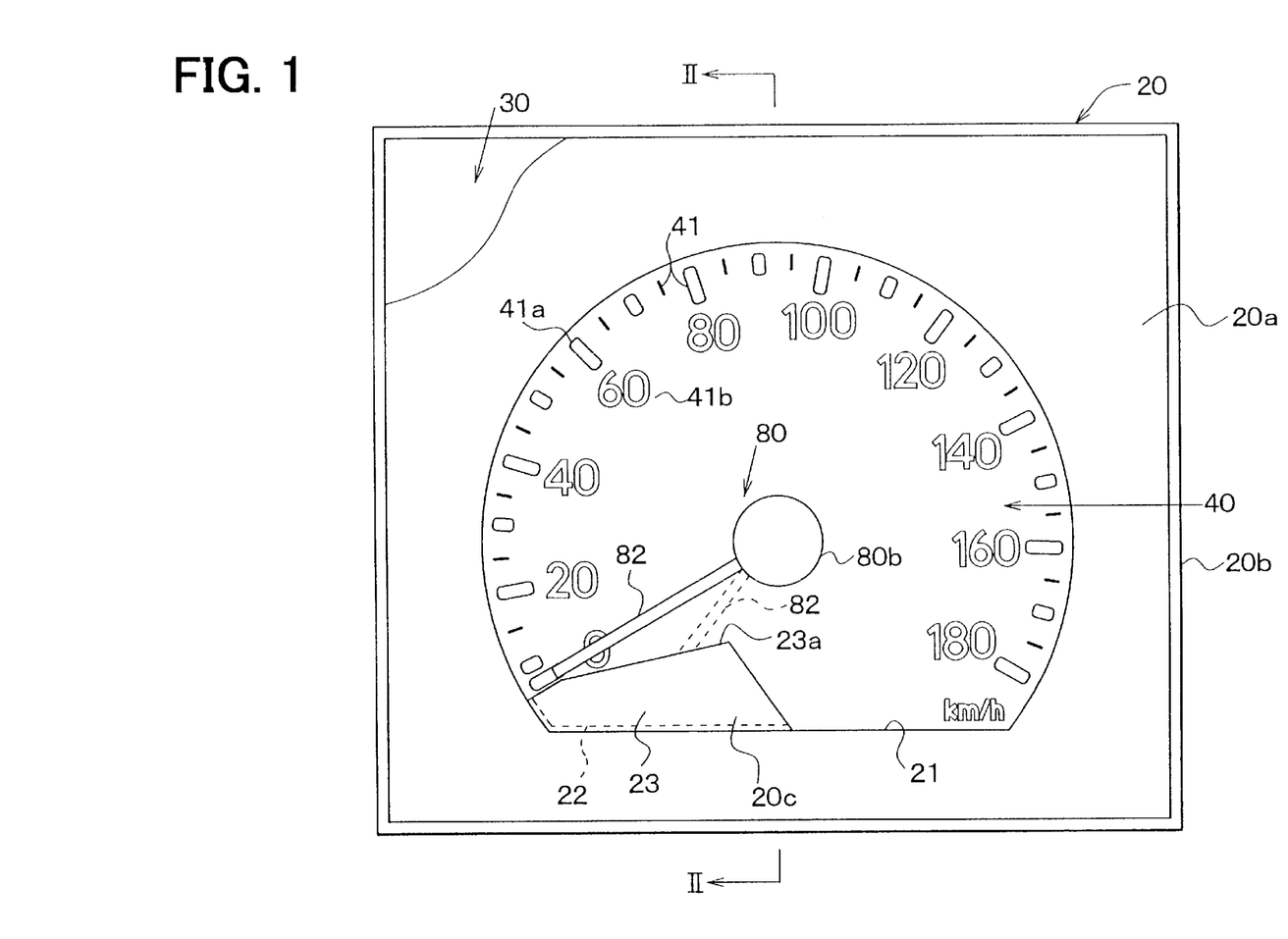
FIG. 1 is a front view showing a speedometer for use in an automobile as a first embodiment of the present invention.

Upon turning off the ignition switch IG, the controller 100 controls the driving circuit 120 so that the pointer 80 further rotates counter-clockwise from the zero-scale position to its rest position (from a position shown by a solid line to a position shown by a dotted line in FIG. 1). At the rest position, a part of the pointer needle 82 is covered by the pointer cover 20c and becomes invisible. Upon turning on the ignition switch IG, the controller 100 controls the driving circuit 120 so that the pointer 80 rotates clockwise from the rest position to the zero-scale position. At the zero-scale position, an entire length of the pointer 80 is exposed and becomes visible. Then, the controller 100 controls the driver circuit 120 so that the pointer 80 rotates clockwise to indicate the vehicle speed on the circular scale 41 according to outputs of the vehicle speed sensor 90.

Now, operation of the first embodiment described above will be explained. When the ignition switch IG is at an OFF-state, the pointer 80 is positioned at the rest position (the position shown by dotted lines in FIG. 1) That is, a part of the pointer needle 82 is covered by the pointer cover 20c, and the pointer needle 82 is not illuminated at the rest position and invisible through the front panel 30.

When the ignition switch IG is turned on, the light-emitting elements 60 are lit by the driving circuit 110 controlled by the controller 100. The light emitted from the light-emitting elements 60 is incident upon the pointer base 81 through the through-hole 42 of the scale plate 40. The light is reflected on the light-reflecting surfaces 81b, 81c and led to the pointer needle 82 to illuminate the pointer needle 82. Since the tip part of the pointer needle 82 is covered by the pointer cover 20c at this stage, only a part of the pointer needle 81 is visible through the front panel 30. At the same time (upon turning on the ignition switch IG), the pointer 80 is rotated clockwise from the rest position to the zero-scale position by the pointer driver 70. During a period in which the pointer 80 is driven from the rest position to the zero-scale position, the length of the illuminated pointer needle 82 exposed from the pointer cover 20 becomes gradually longer until it is fully exposed at the zero-scale position. Therefore, the pointer needle 82 looks as if it is gradually extending, thereby giving a new ornamental effect to a driver.

Then, when the vehicle starts to be driven, the illuminated pointer 80 is rotated clockwise from the zero-scale position to indicate the driving speed of the vehicle on the circular scale 41 by the pointer driver 70 which is controlled by the driving circuit 120 under control of the controller 100. When the vehicle stops, the illuminated pointer 80 returns to the zero-scale position. At this position, the entire length of the pointer needle 82 is visible through the front panel 30. Then, upon turning off the ignition switch IG, the pointer 80 is further driven counter-clockwise from the zero-scale position to the rest position. In the course of the pointer rotation from the zero-scale position to the rest position, the illuminated pointer needle 82 is gradually covered by the pointer cover 20c. Therefore, the pointer needle 82 looks like being gradually shortened, which is observed through the front panel 30, giving a new ornamental effect to a driver. When the pointer 80 reaches the rest position, the light-emitting diodes are turned off thereby to terminate pointer illumination.

In summary, during a period in which the illuminated pointer 80 rotates clockwise from the rest position to the zero-scale position upon turning on the ignition switch (or the key switch), the pointer needle 82 partly covered by the pointer cover 20c becomes gradually uncovered. During a period in which the illuminated pointer 80 rotates counter-clockwise from the zero-scale position to the rest position upon turning off the ignition switch, a part of the illuminated pointer needle 82 is gradually covered by the pointer cover 20c. In this manner, the illuminated pointer needle 82 looks like being shortened or extended without providing mechanical structures for actually changing the length of the pointer needle 82.

(Second Embodiment)

Figure 5:
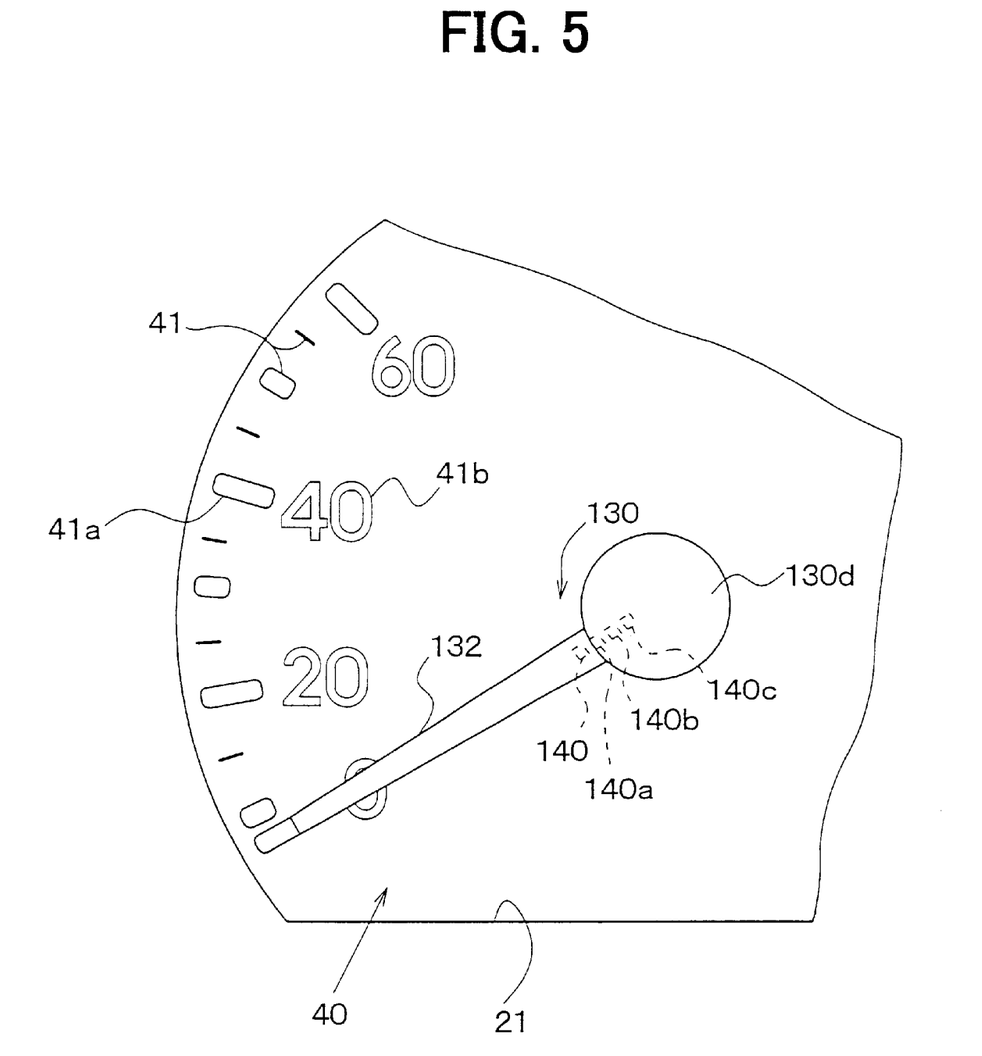
FIG. 5 is a partial front view showing the speedometer shown in FIG. 4.
Figure 6:
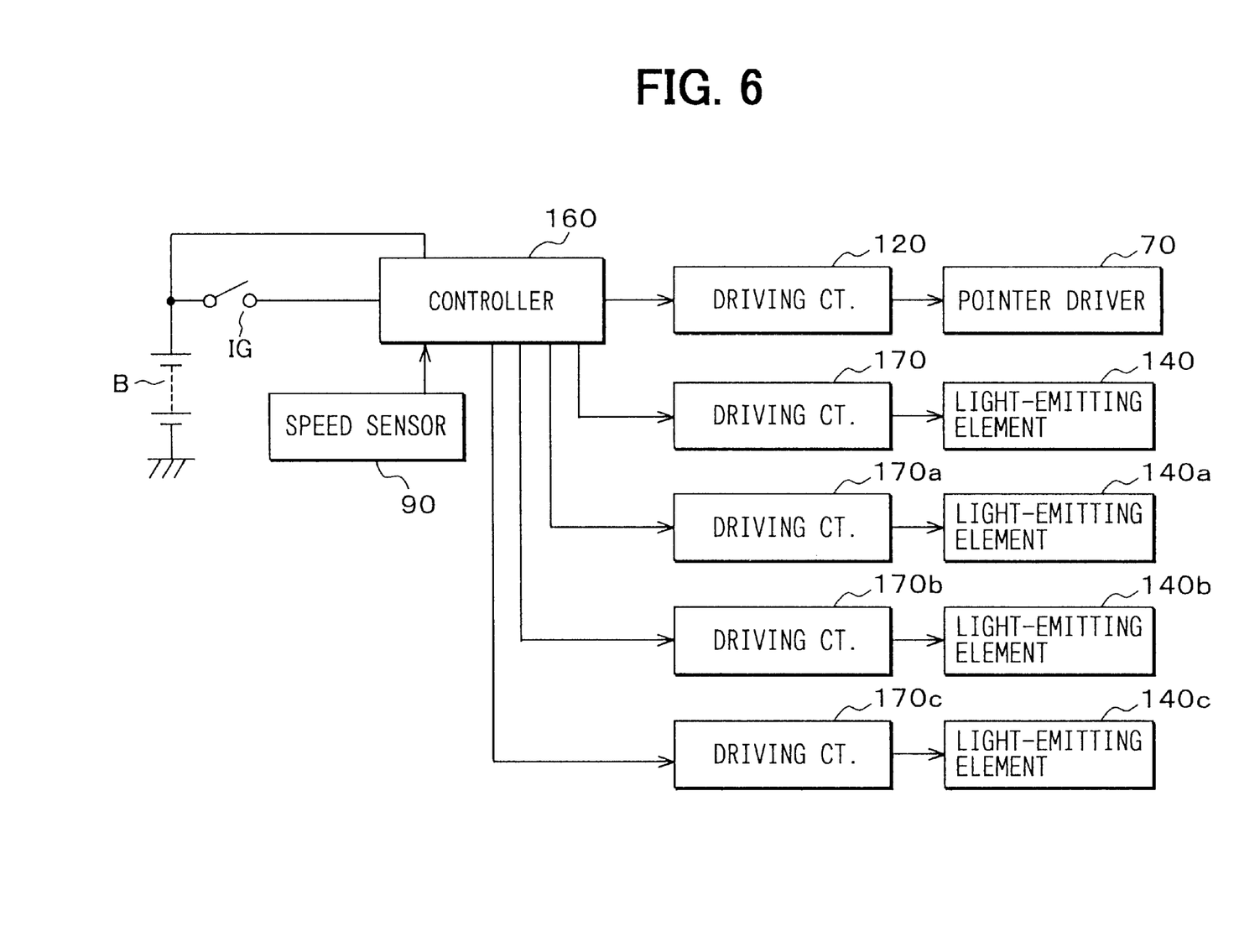
FIG. 6 is a block diagram showing an electrical circuit for controlling operation of the speedometer shown in FIG. 4.

A second embodiment of the present invention will be described with reference to FIGS. 4–6. In this embodiment, the pointer 80, the light-emitting elements 60, the controller 100 and the driver circuit 110 used in the first embodiment are replaced with a pointer 130, four light-emitting elements 140–140c including a light-conducting member 150, a controller 160 and driving circuits 170–170c, respectively. Further, the pointer cover 20c used in the first embodiment is eliminated.

Figure 4:
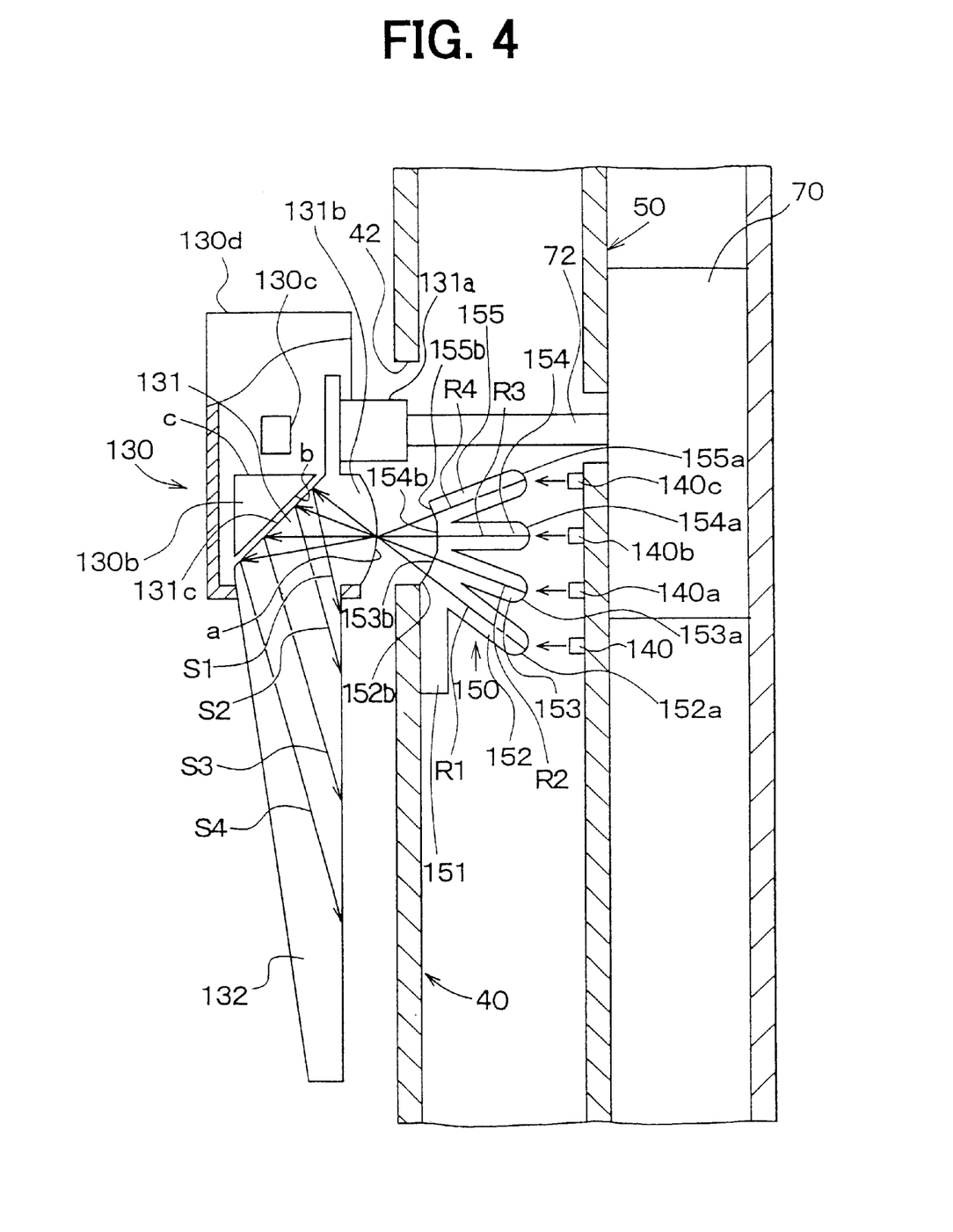
FIG. 4 is a cross-sectional view showing a speedometer, as a second embodiment of the present invention.

As shown in FIG. 4, the pointer 130 is composed of a pointer needle 132 made of a transparent resin material, a pointer base 131 connected to the pointer needle 132, a rectangular prism 130b, a light-emitting element 130c such as a light-emitting diode, and a cap 130d for intercepting light emitted from the pointer base 131. The pointer base 131 includes a cylindrical boss 131a and a convex member 131b. The cylindrical boss 131a is connected to the driving axis 72 extending from the pointer driver 70 so that the pointer 130 is rotated by the pointer driver 70. The convex member 131b is formed next to the boss 131a at a position closer to the tip of the pointer needle 132.

The convex member 131b includes a convex lens surface "a" from which light emitted from the light-emitting elements 140–140c is introduced and a slanted reflecting surface 131c that reflects the introduced light toward the pointer needle 132. The rectangular prism 130b includes a light-emitting surface "b" facing the light-reflecting surface 131c and a light-introducing surface "c" from which light emitted from the light-emitting element 130c is introduced. The cap 130d is disposed to cover the pointer base 131, the rectangular prism 130b and the light-emitting element 130c.

As shown in FIG. 4, the light-emitting elements 140–140c, such as light-emitting diodes, are aligned in line on the circuit board 50. The light-emitting element 140c is positioned closest to the driving axis 72 and the light-emitting element 140 farthest therefrom. As shown in FIG. 5, the light-emitting elements 140–140c are positioned on the circuit board 50 so that they are aligned along a longitudinal direction of the pointer needle 132 when the pointer needle 132 is at the zero-scale position. Each light-emitting element 140–140c emits light toward the light-conducting member 150 in a direction perpendicular to the surface of the circuit board 50.

The light-conducting member 150 is made of transparent resin material and includes a supporting portion 151 connected to the scale plate 40 and four light passages 152–155. The light passages 152–155 are radially extending to face respective light-emitting elements 140–140c. A width of the light-conducting member 150 is made same as that of the pointer needle 132. The light-conducting member 150 is positioned to be interposed between the pointer 130 and the light-emitting elements 140–140c when the pointer 130 is at the zero-scale position.

An end of each light passage 152–155 facing each light-emitting element 140–140c is rounded to form a respective convex lens 152a–155a. The other end of each light passage 152–155 has a respective end surface 152b–155b. Light emitted from the light-emitting element 140 enters into the light passage 152 through its convex lens 152a and is led to the light-reflecting surface 131c along a line R1 through the convex surface "a" of the convex member 131b. The light is reflected on the light-reflecting surface 131c toward the pointer needle 132 along a line S1, as shown in FIG. 4. Similarly, light emitted from the light-emitting element 140a is introduced into the pointer needle 132 along lines R2 and S2; light from the element 140b along lines R3 and S3; and light from the element 140c along lines R4 and S4. In this manner, the light emitted from the element 140c is introduced into the pointer needle 132 up to its tip portion, while the light emitted from the element 140 reaches a position closest to the convex member 131b. Thus, the light from four light-emitting elements 140–140c is distributed to an entire length of the pointer needle 132.

An electric circuit for operating the second embodiment will be described with reference to FIG. 6. The vehicle speed sensor 90 connected to a controller 160 detects a driving speed of a vehicle. The controller 160 including a microcomputer is always kept ready to operate by an on-board battery B. Electric power is supplied to the controller 160 from the battery B by turning on an ignition switch IG, and the controller 160 controls, under a program contained therein, operation of driving circuits 170–170c for driving the light-emitting elements 140–140c and a driving circuit 120 for driving the pointer driver 70. The controller 160 also controls operation of the light-emitting element 130c (shown in FIG. 4, not shown in FIG. 6).

Upon turning on the ignition switch IG, the light-emitting elements 140–140c are sequentially lit with a certain time lag among each elements. That is, the light-emitting element 140 is first lit, and then 140a, 140b, 140c are sequentially lit in this order. Therefore, the pointer needle 132 is progressively illuminated from its foot portion to its tip portion. After all the light-emitting elements 140–140c are lit, the light-emitting element 130c is lit under control of the controller 160. The light emitted from the light-emitting element 130c is introduced into the pointer needle 132 through the rectangular prism 130b to illuminate an entire length of the pointer needle 132. Then, the light-emitting elements 140–140c are all turned off. Then, the pointer 80 is driven by the pointer driver 70 to indicate a driving speed of a vehicle according to outputs of the vehicle speed sensor 90. Upon turning off the ignition switch IG, the light-emitting element 130c is turned off.

Now, operation of the second embodiment described above will be summarized. Under the situation where the ignition switch IG is at the OFF state, the pointer 130 is at the zero-scale position as shown in FIG. 5 and is not illuminated at all at this stage. The pointer 130 is not visible through the front panel 30. When the ignition switch IG is turned on, the light-emitting elements 140–140c are progressively lit as described above, and thereby the pointer needle 132 is sequentially illuminated from its foot portion toward its tip portion. The pointer 130 staying at the zero-scale position becomes visible through the front panel 30 as if it were extending by itself. Then, the light-emitting element 130c illuminating the entire length of the pointer needle 132 is lit, and the light-emitting elements 140–140c are turned off. When the vehicle is driven, the pointer 130 illuminated by the light-emitting element 130c indicates a driving speed of the vehicle according to the outputs of the speed sensor 90. When the vehicle stops, the pointer 130 returns to the zero-scale position. Upon turning off the ignition switch IG, the light-emitting element 130c is turned off thereby to terminate illumination of the pointer needle 132.

(Third Embodiment)

Figure 7:
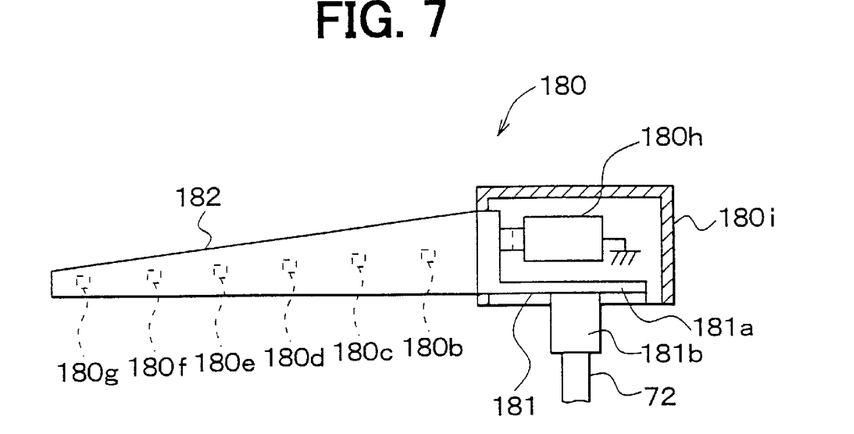
FIG. 7 is a side view showing a pointer of a meter as a third embodiment of the present invention.
Figure 8:
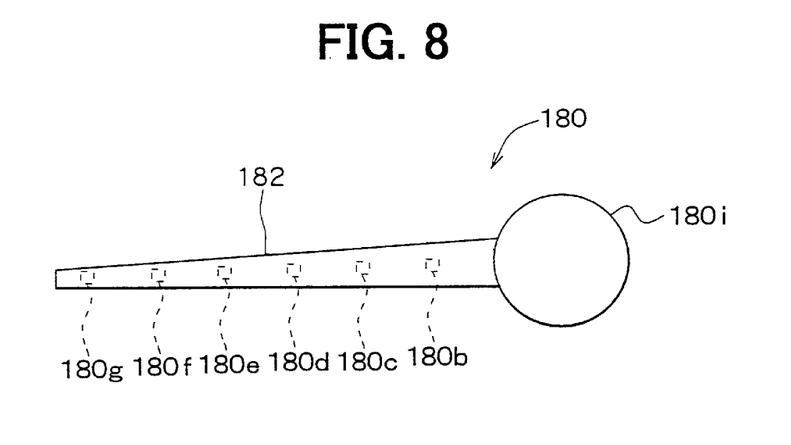
FIG. 8 is a front view showing the pointer shown in FIG. 7.
Figure 9:
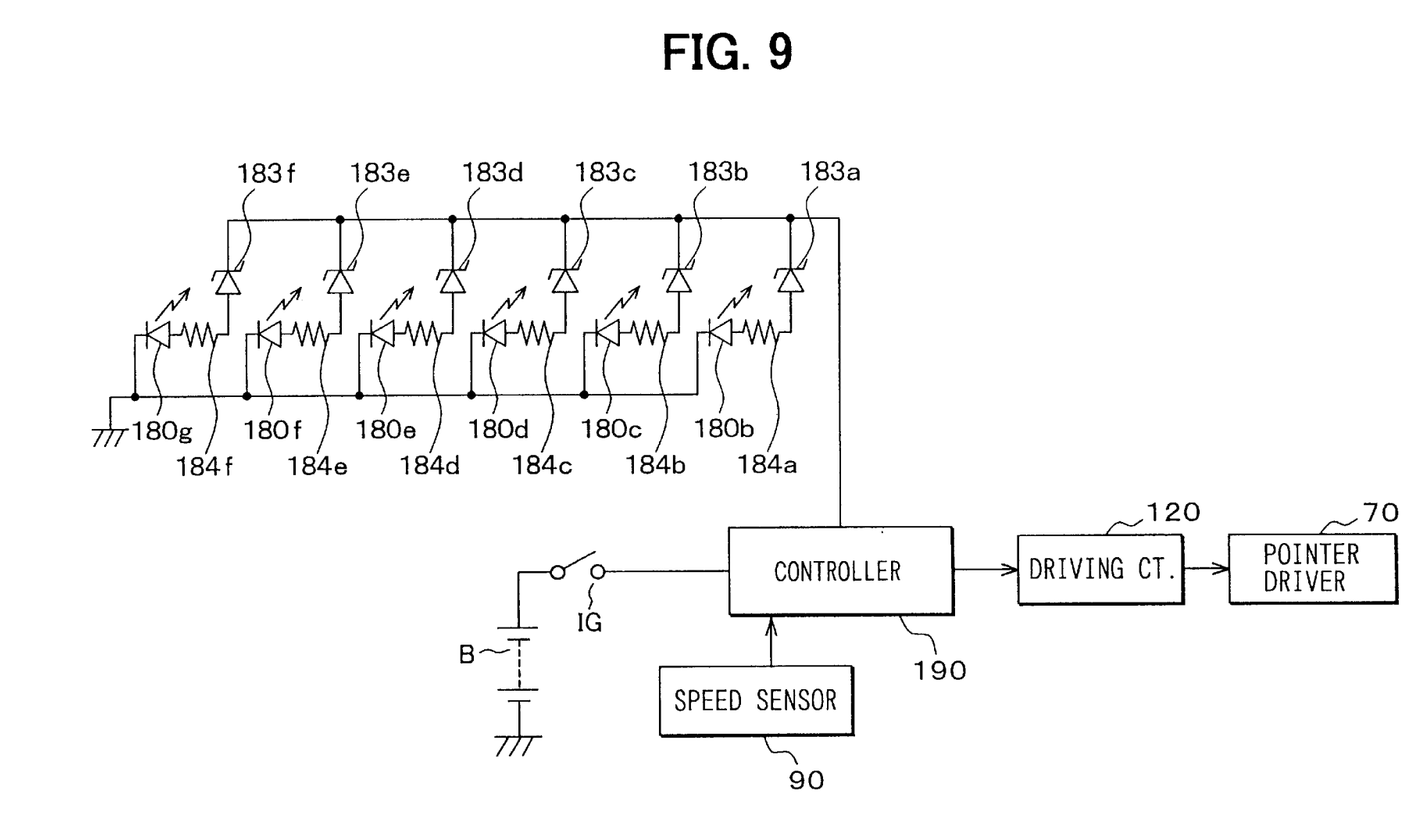
FIG. 9 is a block diagram showing an electrical circuit for driving light-emitting elements embedded in the pointer shown in FIG. 7.

A third embodiment of the present invention will be described with reference to FIGS. 7–9. In this embodiment, the pointer 130 of the second embodiment is replaced with a pointer 180, and the device for illuminating the pointer is changed. As shown in FIGS. 7 and 8, the pointer 180 includes a pointer needle 182 made of a transparent resin material, a pointer base 181 connected to the pointer needle 182, plural light-emitting elements 180b–180g embedded in the pointer needle 182, a driving circuit 180h for driving the light-emitting elements 180b–180g, and a light-intercepting cap 180i.

The pointer base 181 connected to the pointer needle 182 includes a flat connecting portion 181a and a cylindrical boss 181b connected to the driving axis 72 extending from the pointer driver 70. A rear surface of the pointer needle 182 are made flat in parallel to the front surface of the scale plate 40, and a front surface thereof is slanted as shown in FIG. 7. The light-emitting elements 180b–180g, such as light-emitting diodes, are embedded in the pointer needle 182 along its longitudinal direction, as shown in FIGS. 7 and 8.

The driving circuit 180h supported above the pointer base 181 drives the light-emitting elements 180b–180g in a controlled manner. The driving circuit 180h, as shown in FIG. 9, includes Zener diodes 183a–183f and resistors 184a–184f. An anode of the Zener diode 183a is connected to an anode of the light-emitting diode 180b through the resistor 184a. An cathode of the Zener diode 183a is connected to a controller 190, and a cathode of the light-emitting diode 180b is grounded. Thus, the Zener diode 183a, the resistor 184a and the light-emitting diode 180b form a first series circuit. Similarly, the Zener diode 183b, the resistor 184b and the light-emitting diode 180c form a second series circuit; the Zener diode 183c, the resistor 184c and the light-emitting diode 180d form a third series circuit; the Zener diode 183d, the resistor 184d and the light-emitting diode 180e form a fourth series circuit; the Zener diode 183e, the resistor 184e and the light-emitting diode 180f form a fifth series circuit; and the Zener diode 183f, the resistor 184f and the light-emitting diode 180g form a sixth series circuit.

A breakdown voltage of the Zener diode 183a positioned at a foot of the pointer needle 182 is set to a lowest level, and breakdown voltages of other Zener diodes 183b–183f are set to respective levels gradually increasing toward the tip portion of the pointer needle 182. The controller 190 supplies gradually increasing or step-wise increasing voltages to the six series circuits connected in parallel to each other, and thereby the light-emitting diodes 180b–180g are sequentially lit in this order. Therefore, the pointer needle 182 is progressively illuminated from its foot portion to the tip portion. After the pointer needle 182 is fully illuminated at the zero-scale position, the pointer 180 is driven by the pointer driver 70 to indicate a driving speed of a vehicle according to the outputs of the speed sensor 90. Upon turning off the ignition switch IG, the light-emitting diodes are turned off in a reverse order from the diode positioned at the tip to the diode positioned at the foot portion.

The third embodiment described above operates in the following manner. When the ignition switch IG is at the OFF state, the pointer 180 is at the zero-scale position and the light-emitting diodes 180b–180g embedded in the pointer needle 182 are not lit. Therefore, the pointer needle 182 is not visible through the front panel 30. Upon turning on the ignition switch IG, the light-emitting diodes 180b–180g are lit sequentially from the diode 180b toward the diode 180g, since the breakdown voltages of those diodes are set to respectively different levels as described above. Accordingly, the pointer needle 182 is progressively illuminated from its foot portion toward its tip portion. The pointer needle 182 thus illuminated is visible through the font panel 30. The pointer needle 182 is observed as if it were progressively extending, thereby giving a new ornamental effect to a viewer.

When the vehicle is driven, the fully illuminated pointer 180 is rotated by the pointer driver 70 according to the outputs of the speed sensor 90, thereby indicating the driving speed of the vehicle. When the vehicle stops, the pointer 180 returns to the zero-scale position. Upon turning off the ignition switch IG, the light-emitting diodes 180g positioned at the tip of the pointer needle 182 is first turned off, and then other light-emitting diodes 180f–180b are sequentially turned off in this order. The light-emitting diode 180b positioned at the foot portion is last turned off. Accordingly, the illumination of the pointer needle 182 progressively disappears from the tip portion toward the foot portion. The pointer needle 182 is observed through the front panel 30 as if the pointer needle 182 were progressively shortened, giving an ornamental effect to a viewer.

(Fourth Embodiment)

Figure 10:
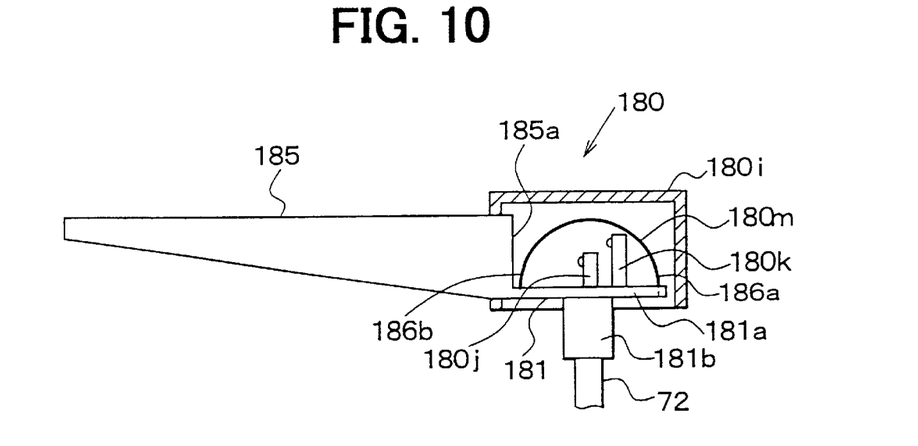
FIG. 10 is a side view showing a pointer of a meter as a fourth embodiment of the present invention.

A fourth embodiment of the present invention will be described with reference to FIG. 10. In this embodiment, the illumination mechanism used in the third embodiment is modified. That is, the light-emitting diodes 180b–180g embedded in the pointer needle 182 in the third embodiment are eliminated, and light-emitting elements 180j, 180k and a bimetal cover 180m are employed. Further, as shown in FIG. 10, a front surface of a pointer needle 185 is made flat and a rear surface thereof is slanted.

Each light-emitting element 180j, 180k includes a light emitting diode supported by a rod fixed on the connecting portion 181a of the pointer base 181. The light-emitting diode of the light-emitting element 180j is positioned lower than that of the light-emitting element 180k. Light is emitted from both diodes in a direction parallel to the front surface of the pointer needle 185 and reflected on the rear surface of the pointer needle 185. The light emitted from the element 180j reaches an area closer to the foot portion of the pointer needle 185, while the light emitted from the element 180k reaches an area farther from the foot portion.

The bimetal cover 180m is formed in a convex shape covering both light-emitting elements 180j, 180k. The bimetal cover 180m is fixed to the connecting portion 181a at its one end 186a, and the other end 186b is made free. The bimetal cover 180m takes a position as shown in FIG. 10, covering both light-emitting elements 180j, 180k, when it is not heated. When it is heated by supplying electric current, its free end 186b is raised upward thereby to expose the light-emitting elements 180j, 180k. The light-emitting elements 180j, 180k are lit under control of the controller 190 when the ignition switch IG is turned on. At the same time, the bimetal cover 180m is heated to gradually uncover the light-emitting elements 180j, 180k thereby to illuminate the pointer needle 185. The bimetal cover 180m is covered with a light-intercepting cap 180i. Other structures of the fourth embodiment are the same as those of the third embodiment.

The fourth embodiment operates in the following manner. When the ignition switch IG is at the OFF state, the pointer 180 is at the zero-scale position, and the pointer needle 185 is not illuminated. Accordingly, the pointer 180 is not visible through the font panel 30.

Upon turning on the ignition switch IG, both of the light-emitting elements 180j, 180k are lit. At this moment, however, the pointer needle 185 is not illuminated because both elements are covered by the bimetal cover 180m. Immediately after both elements 180j, 180k are lit, electric current is supplied to the bimetal cover 180m to heat the bimetal cover 180m. An amount of current is gradually increased to progressively lift the free end 186b of the bimetal cover 180m thereby to expose the light-emitting elements 180j, 180k from the bimetal cover 180m. The light-emitting element 180j is first exposed thereby to illuminate the foot portion of the pointer needle 185, and then the light-emitting element 180k is exposed to illuminate the tip portion of the pointer needle 185. Accordingly, the pointer needle 185 is progressively illuminated from its foot portion toward the tip portion. The pointer needle 185 illuminated in this manner is observed through the front panel 30. The pointer needle 185 looks like extending at the zero-scale position.

When the vehicle is driven, the pointer 180 fully illuminated is rotated by the pointer driver 70 to indicate the driving speed of the vehicle according to the outputs of the speed sensor 90. When the vehicle stops, the pointer 180 returns to the zero-scale position. Upon turning off the ignition switch IG, the electric current supplied to the bimetal cover 180m is gradually decreased thereby to gradually cover the light-emitting elements 180j, 180k. The light-emitting element 180k illuminating the tip portion of the pointer needle 185 is first covered, and then the light-emitting element 180j illuminating the foot portion is covered. Accordingly, the illumination of the pointer needle 185 is gradually disappears from the tip portion toward the foot portion. The pointer needle 185 is observed through the front panel 30 as if it is gradually shortened, giving an ornamental effect to a driver or a passenger. After the bimetal cover 180m returns to its original position shown in FIG. 10 and fully covers both of the light-emitting elements 180j, 180k, both of the light-emitting elements are turned off.

The present invention is not limited to the embodiments described above, but it may be variously modified. For example, in the first embodiment, the light-emitting elements 60 mounted on the circuit board 50 may be replaced with a light source disposed in the light-intercepting cap 80b. The pointer 80 may be illuminated by that light source. The light-emitting elements used in the foregoing embodiments are not limited to the light-emitting diodes. Other light sources such as candescent lamps may be used. The present invention may be applied to automotive meters other than the speedometer, such as tachometers, fuel gauges or water-temperature gauges. The ignition switch IG described in the foregoing embodiments may be a key switch for starting a driving motor, in case the present invention is applied to a meter for use in an electric vehicle.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A meter for use in an automotive vehicle comprising:
    a scale plate having scale positions aligned circularly from a zero-scale position to a full-scale position in a clockwise direction;
    a pointer adapted to rotate along a front surface of the scale plate; and
    a pointer driver disposed behind the scale plate and connected to the pointer to rotate the pointer under control of an electronic controller, wherein:
        the pointer is adapted to rotate counter-clockwise beyond the zero-scale position up to a rest position;
        the scale plate includes a pointer cover that partly covers the pointer when the pointer is positioned between the zero-scale position and the rest position;
        when a key switch of the automotive vehicle is at an off state, the pointer is positioned at the rest position and a tip portion of the pointer is covered by the pointer cover;
        upon turning on the key switch, the pointer is illuminated and rotated clockwise from the rest position to the zero-scale position, and the portion of the pointer covered by the pointer cover gradually decreases in a course of rotation and the pointer is fully exposed from the pointer cover at the zero-scale position; and
        upon turning off the key switch, the pointer further rotates counter-clockwise from the zero-scale position to the rest position while keeping the pointer illuminated, and the portion of the pointer covered by the pointer cover gradually increases in the course of the rotation, and the illumination of the pointer is turned off at the rest position.

2. A meter for use in an automotive vehicle comprising:
    a scale plate having scale positions aligned circularly from a zero-scale position to a full-scale position in a clockwise direction;
    a pointer adapted to rotate along a front surface of the scale plate, the pointer including a pointer base and a pointer needle formed integrally with the pointer base;
    a pointer driver disposed behind the scale plate and connected to the pointer base to rotate the pointer under control of an electronic controller; and
    a light source for illuminating an entire length of the pointer needle, the light source being disposed close to the pointer base, wherein:
        the meter further includes a plurality of light-emitting elements disposed behind the scale plate for illuminating the pointer needle when the pointer is at the zero-scale position, the plurality of light-emitting elements being aligned along a longitudinal direction of the pointer needle positioned at the zero-scale position, and a light-conducting member disposed between the plurality of light-emitting elements and the pointer base for conducting light emitted from the plurality of the light-emitting elements to the pointer base;
        the pointer base includes a light-reflecting surface that distributes light emitted from the plurality of light-emitting elements to respective portions in the pointer needle according to a position of each light-emitting element, the light emitted from the light-emitting elements positioned closer to a driving axis of the pointer driver being distributed to portions in the pointer needle remoter from the driving axis; and the plurality of the light-emitting elements are progressively lit, when the pointer is at the zero-scale position, from one of the light-emitting elements positioned remotest from the driving axis until the light-emitting elements are all lit, so that the pointer needle is progressively illuminated from its foot portion toward its tip portion.

3. The meter as in claim 2, wherein:

the light-conducting member includes a plurality of light passages, each corresponding to one of the plurality of the light-emitting elements.

4. A meter for use in an automotive vehicle comprising:

a scale plate having scale positions aligned circularly from a zero-scale position to a full-scale position in a clockwise direction;

a pointer adapted to rotate along a front surface of the scale plate, the pointer including a pointer base and a pointer needle formed integrally with the pointer base; and a pointer driver disposed behind the scale plate and connected to the pointer base to rotate the pointer under control of an electronic controller, wherein:

a plurality of light-emitting elements are embedded in the pointer needle throughout an entire length thereof; and when a key switch of the automotive vehicle is turned on and the pointer is at the zero-scale position, the plurality of light-emitting elements are lit, under control of the electronic controller, one by one from one of the light-emitting elements positioned closest to the pointer base until all of the plurality of light-emitting elements are lit, so that the pointer needle is progressively illuminated from its foot portion toward its tip portion.

5. The meter as in claim 4, wherein:

upon turning off the key switch when the pointer is at the zero-scale position, the plurality of light-emitting elements are turned off, under control of the electronic controller, one by one from one of the light-emitting elements positioned remotest from the pointer base until all of the plurality of light-emitting elements are turned off, so that illumination of the pointer needle progressively disappears from its tip portion toward its foot portion.

6. The meter as in claim 4, wherein:

the plurality of light-emitting elements are light-emitting diodes;

a Zener diode is connected to each light-emitting diode in series;

a breakdown voltage of each Zener diode is set in such a manner that the breakdown voltage of the Zener diode connected to the light-emitting diode positioned closest to the pointer base is the lowest, and the breakdown voltage of the Zener diodes connected to other light-emitting diodes is gradually increasing as positions of the light-emitting diodes become remoter from the pointer base, so that the Zener diodes sequentially breakdown as a voltage applied thereto increases; and the light-emitting diodes are sequentially lit from the light-emitting diode positioned closest to the pointer base until all of the light-emitting diodes are lit, so that the pointer needle is progressively illuminated from its foot portion toward its tip portion.

7. The meter as in claim 5, wherein:

the plurality of light-emitting elements are light-emitting diodes;

a Zener diode is connected to each light-emitting diode in series;

a breakdown voltage of each Zener diode is set in such a manner that the breakdown voltage of the Zener diode connected to the light-emitting diode positioned closest to the pointer base is the lowest, and the breakdown voltage of the Zener diodes connected to other light-emitting diodes is gradually increasing as positions of the light-emitting diodes become remoter from the pointer base, so that the Zener diodes sequentially become non-conductive as a voltage applied thereto decreases; and the light-emitting diodes are sequentially turned off from the light-emitting diode positioned remotest from the pointer base until all of the light-emitting diodes are turned off, so that illumination of the pointer needle progressively disappears from its tip portion toward its foot portion.

8. A meter for use in an automotive vehicle comprising:

a scale plate having scale positions aligned circularly from a zero-scale position to a full-scale position in a clockwise direction;

a pointer adapted to rotate along a front surface of the scale plate, the pointer including a pointer base and a pointer needle formed integrally with the pointer base; and a pointer driver disposed behind the scale plate and connected to the pointer base to rotate the pointer under control of an electronic controller, wherein:

a plurality of light-emitting elements are disposed on the pointer base and covered by a bimetal cover; and when a key switch of the automotive vehicle is turned on and the pointer is at the zero-scale position, the plurality of light-emitting elements are all lit, under control of the electronic controller, and at the same time the bimetal cover is heated to gradually uncover the plurality of light-emitting elements to expose the light-emitting elements one by one from the bimetal cover, so that the pointer needle is progressively illuminated from its foot portion toward its tip portion.

9. A meter according to claim 1, wherein the meter comprises a front panel covering the scale plate and the pointer, and the front panel makes the scale plate and the pointer invisible when the meter is not in operation.

* * * * *